Aug. 26, 1941.     A. BOER     2,254,135
PROCESS AND APPARATUS FOR SEPARATING DISINTEGRATED SOLID MATERIALS
Filed Sept. 8, 1939     6 Sheets-Sheet 1

Inventor
Arpad Boer,
Attorneys

Aug. 26, 1941.    A. BOER    2,254,135

PROCESS AND APPARATUS FOR SEPARATING DISINTEGRATED SOLID MATERIALS

Filed Sept. 8, 1939    6 Sheets-Sheet 2

Inventor
Arpad Boer;
By Wachauffer & Groff
Attorneys

Aug. 26, 1941.  A. BOER  2,254,135
PROCESS AND APPARATUS FOR SEPARATING DISINTEGRATED SOLID MATERIALS
Filed Sept. 8, 1939  6 Sheets-Sheet 3

Inventor
Arpad Boer,
By Willauffel & Groff
Attorneys

Aug. 26, 1941. A. BOER 2,254,135
PROCESS AND APPARATUS FOR SEPARATING DISINTEGRATED SOLID MATERIALS
Filed Sept. 8, 1939 6 Sheets-Sheet 4
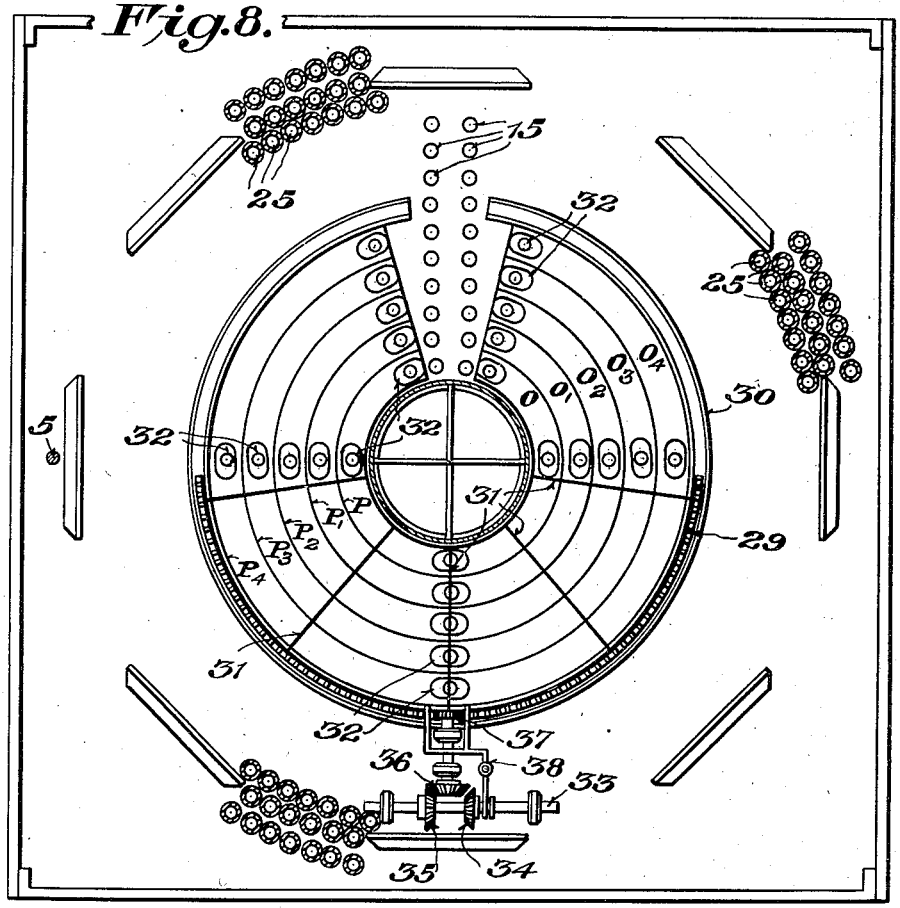
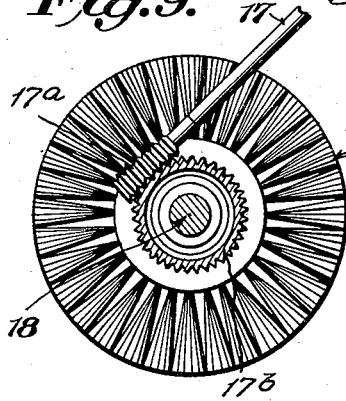
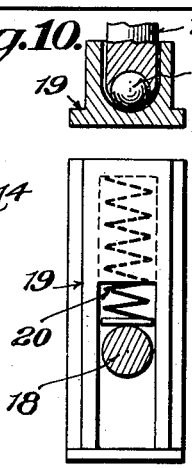
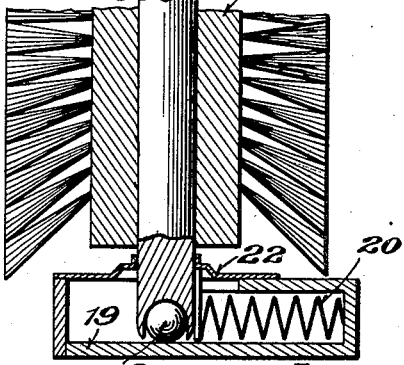
INVENTOR
Arpad Boer, Aug. 26, 1941.   A. BOER   2,254,135
PROCESS AND APPARATUS FOR SEPARATING DISINTEGRATED SOLID MATERIALS
Filed Sept. 8, 1939   6 Sheets-Sheet 5

Arpad Boer,
By Walhaupter & Groff
Attorneys

Patented Aug. 26, 1941

2,254,135

UNITED STATES PATENT OFFICE 2,254,135

PROCESS AND APPARATUS FOR SEPARATING DISINTEGRATED SOLID MATERIALS

Arpad Boer, Martinez, Argentina

Application September 8, 1939, Serial No. 294,008
In Argentina April 13, 1939

3 Claims. (Cl. 209—127)

This invention relates to an improved process and apparatus for separating solid, physically disintegrated materials of mineral, vegetable or animal origin; mixtures or conglomerates thereof, either in a natural, dried or desiccated condition, in the shape of powder or in a granular, fibrous, cellular or other similar condition, according to the properties of their molecular components, and for classifying or grading the components consisting of similar materials by their surfaces and masses by means of the difference of their electric charge. The particles of material to be separated and classified by being electrically charged and thus converted into carriers of electricity, in similar conditions and by the same process, receive their electric charges—volume or amount of electricity—in accordance with the particular features of one of their physical properties, i. e., their electric conductivity, and the particles of similar material in proportion to their surfaces.

The said differentiation of the electric charges, in accordance with the quality and surface of the particles charged with electricity or "carriers of electricity," and the behaviour of the same while moving into the electric field, constitute the basis of this invention.

By physically disintegrating the solid materials, as by crushing, grinding, tearing, raveling, carding, combing, etc., and by causing the particles thus produced to enter into the classifying and separating apparatus, owing to the friction thereby brought about, electricity is being generated which, under certain conditions, may supply the particles under treatment with an electrical charge, thereby converting the same into "carriers of electricity."

By their contact with conductors charged with electricity, the particles of the material to be separated and classified, are also converted into carriers of electricity.

In case the electric charges accumulated by the particles as they are being submitted to the above said processes, are inadequate for the purpose in view or are entirely lacking, the said particles are submitted to ionisation, so as to obtain therein an excess or a deficiency of electrons, whereby they will also be converted into carriers of electricity.

The electricity carrying particles of the material to be separated and classified, are caused to pass through the gap of an electric field or fields, the electrodes of which will attract the particles of opposite polarity, which by transferring their electric charges will adhere to, or will be repelled by the same. By transfer of the respective electric charges, it is to be understood that the particles carrying negative (—) electricity, will give off their excess of electrons, while the carriers of positive (+) electricity, will complete their electronic condition by withdrawing electrons from the electrode.

For the separation and classification in the electric field of the particles physically disintegrated from the material to be treated and converted into carriers of electricity, the following factors will intervene, viz: the electric charge of the particles; the mass, volume, geometric shape and surfaces of the particles; the speed of travel of the particles when performing their trajectory through the electric field; the electric tension and the geometric shape of the electrodes of the electric field and the gap or distance between the same; the longitudinal dimensions of the electric field in the direction of trajectory of the traveling particles when entering the same. In order to perform the separation and classification within the smallest possible space, I prefer to use electric fields arranged in series, of increasing intensity.

The amount, intensity and longitudinal dimensions of the electric field in series will depend on the number of molecular qualitative components to be separated and the necessary classification of particles of similar chemical composition within the maximum and minimum limits of surface and volume of the same.

The variation of intensity of the several electric fields in series is obtained by varying the electric tension of their electrodes, by maintaining the gaps between the same or by altering the distance between the limits or electrodes of the electric fields, while keeping constant the electrical tension.

By varying the intensity and the longitudinal dimension of the electric field, the necessary amount of energy in the same is secured for deviating from their trajectory and attracting toward their limits the particles of a given material of a maximum surface and volume, charged with electricity, which will enter the electric field with an adequate speed.

The essential features of this process will not be altered by the fact that in order to attract the electricity carrying particles, a positive (+) or a negative (—) electrode, or both a positive (+) and a negative (—) electrode of electric field are being used, since the convenient operation of the process only depends on the kind of electric charge carried by the particles of the material to be separated and classified.

An electric generator is used for keeping constant the tension between the electrodes of the electric fields while the classifying and separating process is being performed by attraction toward the limit of the electric field or electrode of the particles carrying electricity of opposite polarity. The energy necessary for performing this work, is supplied by the current generator.

The electric separating and classifying apparatus which forms the object of this invention, has been designed in such a way that the limits of the electric fields or electrodes are constructed of cylindrical shape. This arrangement allows of using a maximum extent of useful surface of the limits of the electric field, in accordance with this invention.

In order to facilitate the understanding of this invention, an apparatus constructed in accordance with the same has been shown, by way of example, in the accompanying drawings, wherein:

Figure 8 is a view in cross section of the lower part of the apparatus.

Figure 9 shows a plan view of a brush used for separating the particles, with its flexible driving shaft.

Figure 10 illustrates a cross section of a ball bearing.

Figure 11 is a plan view of the bearing of the brush.

Figure 12 is a vertical section of the bearing of the brush.

Similar letters of reference have been used to indicate like or corresponding parts in all the several views.

Figure 1:
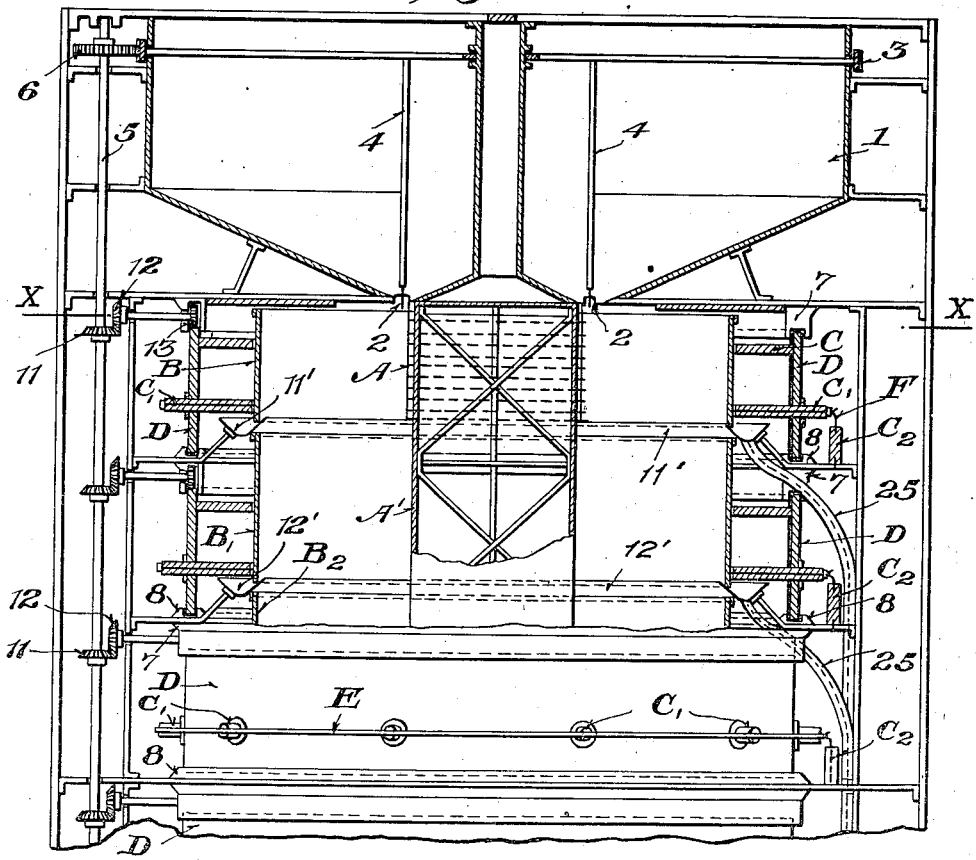
Figure 1 is a view in vertical section of the upper part of the separating and classifying apparatus.
Figure 2:
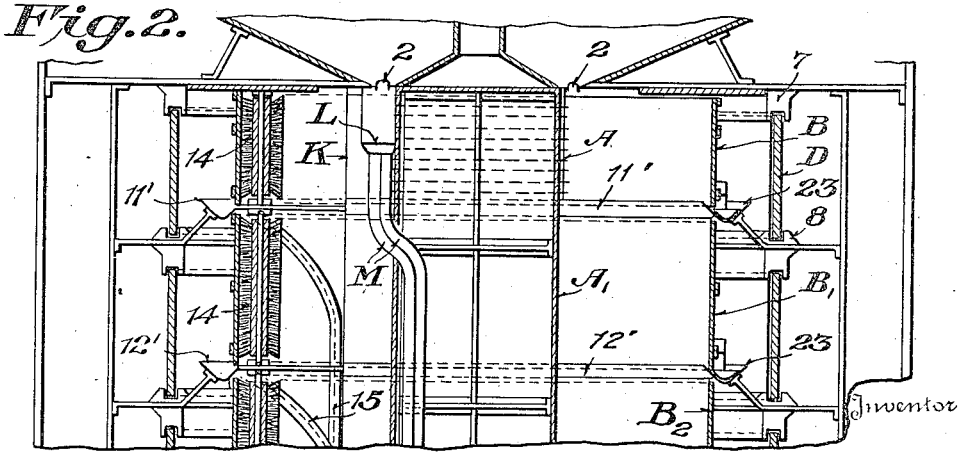
Figure 2 shows a vertical section of the upper part of the apparatus, taken perpendicularly to the plane of Figure 1.

The particles of material to be separated are fed into the cylindrical hopper 1, provided with a conical bottom, whence they fall by gravity through the annular opening 2 into the ionising field A—B. An even and steady descent of the material from the hopper through the opening 2 is assured because of the fact that an agitator is provided. This agitator consists of the annular toothed wheel or rack 3 supported by suitable spokes, which rest at their inner ends in a hub while the outer ends, near the wheel bear in a guideway of the hopper wall. These spokes carry the downwardly extending rods 4 having forked ends operating in the opening 2. The toothed wheel 3 is driven by means of a driving shaft 5, through the gear wheel 6.

The ionising field A—B consists of a negative electrode with points arranged in series, as at A, and of the positive electrode B, of a larger surface, in proportion, than the total surface of the series of points A. The electrodes A and B are connected to a high tension generator. From the said current discharging points, electrons are being constantly delivered by the electrode A, which tend to reach the positive electrode B.

The particles which fall by gravity through the opening 2, are made to travel across the trajectory of said electrons in the field A—B, and by absorption they will become ionised and converted into carriers of electricity, i. e., in this case they will become charged with an excess of electrons withdrawn from those which are being emitted by the current flowing through the points of the electrode A.

The particles on their descent by gravity will leave, as carriers of electricity, the ionising field and enter the electric field A1, B1, formed by the stationary negative (—) electrode A1, of cylindrical shape, and the cylindrical rotary positive (+) electrode B1. The relative position of the cylindrical surface of the electrode A1 and B1 is coaxial.

Figure 16:
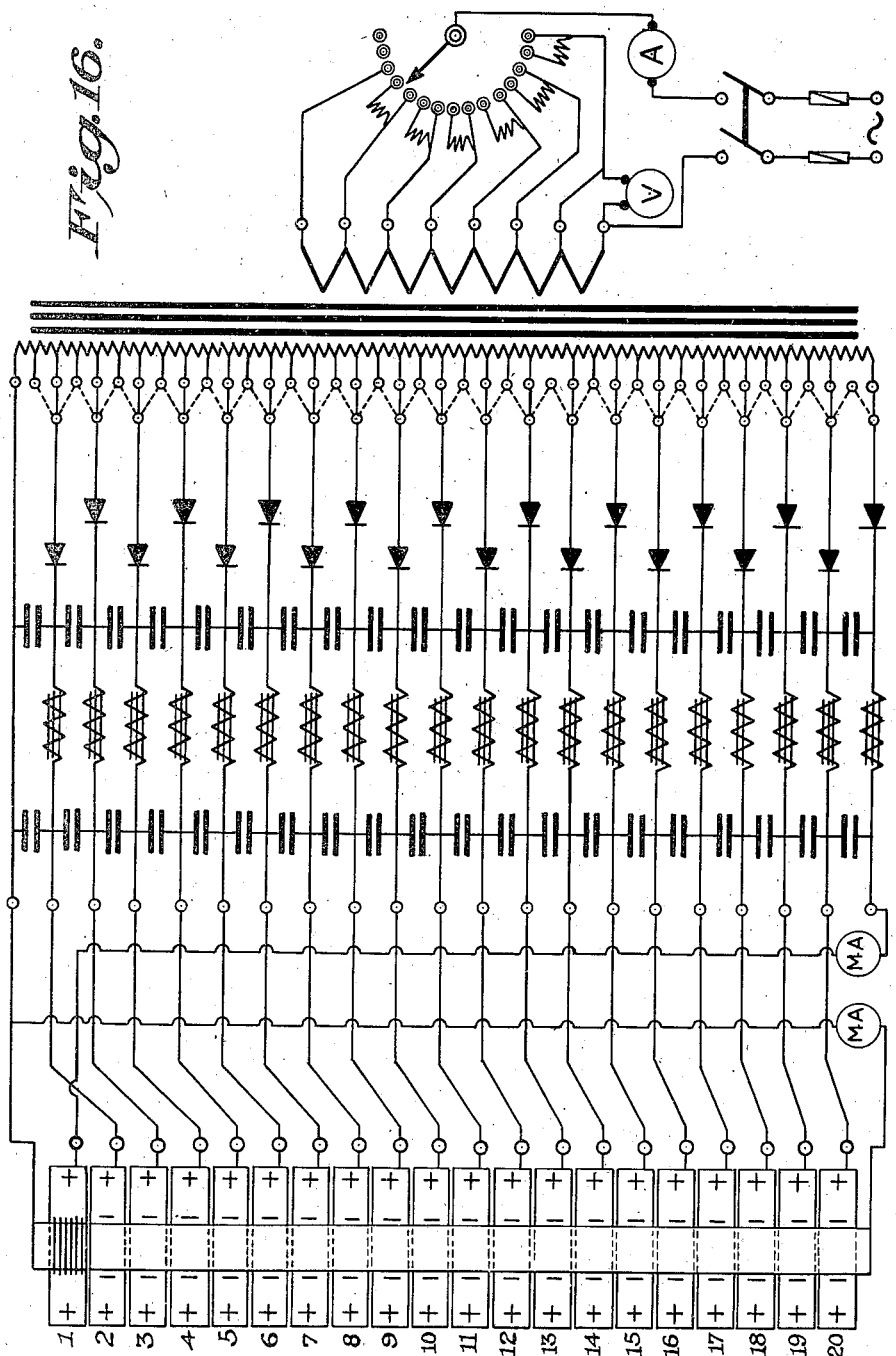
Figure 16 illustrates the arrangement and distribution of the wiring of the electric generator, of the feeder of the ionising field and the electrical fields in series of the apparatus.

The apparatus according to this invention is constructed, as shown in Figure 16, with electrical fields in series, of different intensities, the degree of intensity increasing in the required proportion, the field being arranged in a manner similar to the electrical fields A1, B1.

The electrode B1 is secured by means of the insulators C1, C1 to the outer rotary cylinder or drum D. The electrode B1 receives its electrical charge by means of the conductor ring E, insulated by the tube C1, from the drum D.

The conductor E is electrically connected across the insulating tube C1, by means of the metallic conductor F, snugly fitted to the same, said conductor being carried by insulator C2.

Figure 4:
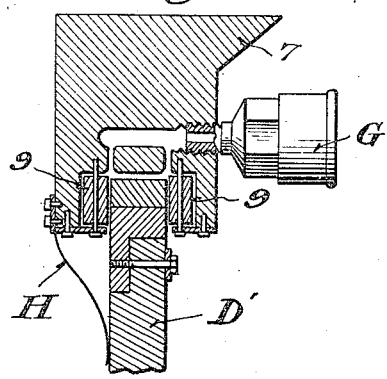
Figure 4 illustrates a cross section of the upper guide rail for the rotary drum.
Figure 5:
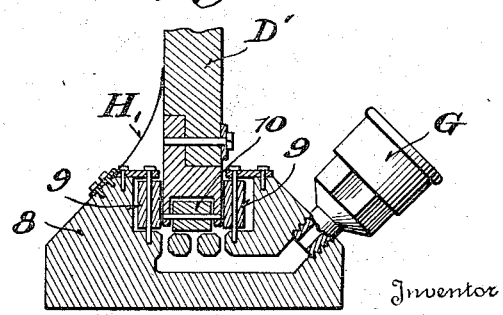
Figure 5 shows a cross section of the lower guide rail of the rotary drum.

As has been shown in cross section in Figures 4 and 5, the drum D1 rotates on the guide rails 7 and 8, between the roller bearings 9 and 10. An oil cup or reservoir G is used for lubricating the tracks of the ball bearings. In order to prevent the particles which may escape from the separator from entering into and accumulating within the said bearings, the circular guide rails are provided with protecting sheets H and H1 which apply against the walls of the drum D.

Figure 3:
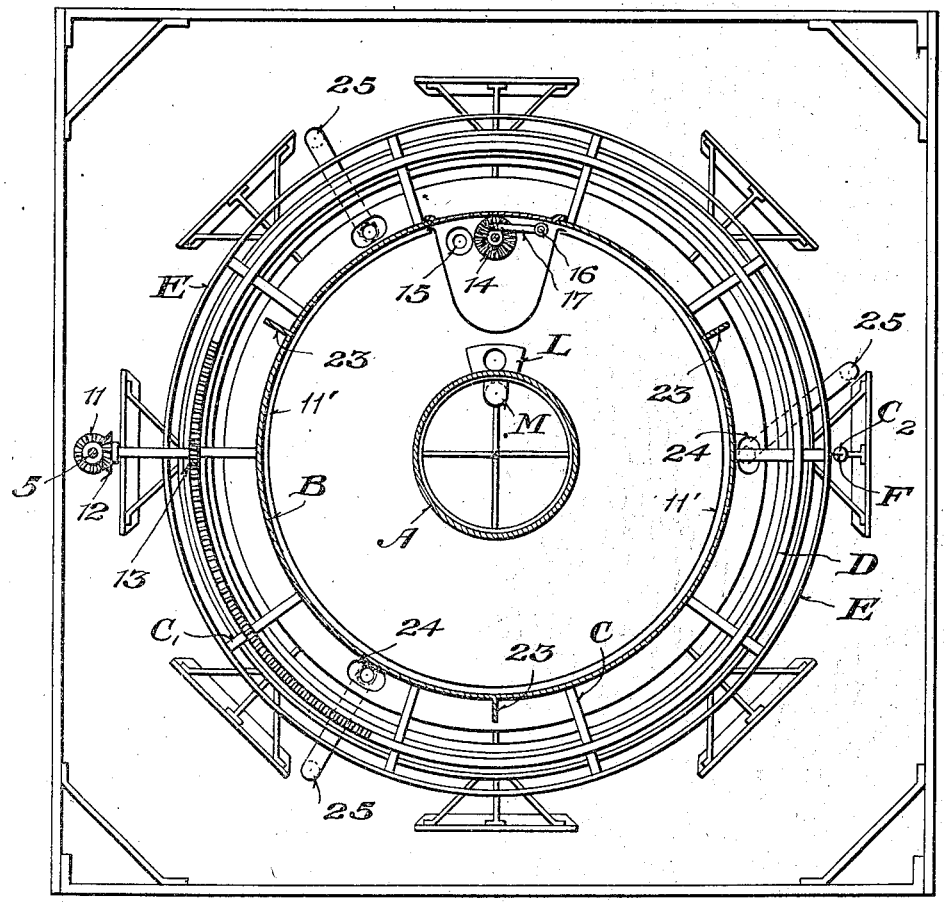
Figure 3 is a sectional plan view of the apparatus, with the feeding hopper removed, taken on line X—X of Fig. 1.

In accordance with Figures 1 and 3, the rotation of the drum D, and the electrode B1 is performed by means of gear rings formed on the outer edges of said drums and which engage with the gears 11, 12 and 13, rotated by the shaft 5 of the main driving gear.

As the particles of the material to be separated and classified arrive, as carriers of electricity, at the electric field A1, B1, A2, B2, A3, B3, etc., they are submitted to the attraction exerted by the positive rotary electrodes B1, B2, B3, etc.

The particles of material to be separated and classified which are of small mass or weight and proportionally of large surface dimensions, being carriers of electricity—negative, in this case, will readily overcome gravity and, following the attraction exerted by the positive electrode B, will reach this latter, give off their charge and adhere to the electrode B1.

The particles dragged along up to the electrodes B1, B2, B3, etc., but which do not adhere to the same, will fall into the annular groove or channel I1', I2', I3', etc.

The electricity-carrying particles of heavier mass and proportionally smaller surface dimensions, will require greater attracting forces to help them to overcome gravity and allow of being carried toward some of the electrodes, arranged in series, with increasing intensity of the electrical field, as has been shown in Figure 16.

The particles adhering to the rotating electrodes B1, B2, B3, etc., are detached therefrom by means of the brush 14 which rotates in a direction opposite to that of the electrodes. The particles detached by the brush 14 will fall into the mouth of the conveyor tubes 15. Rotary motion is transmitted to the brush 14 by means of a rubber wheel 16 on the flexible driving shaft 17 (Fig. 9), having a worm 17a, meshing with worm gear 17b on shaft 18.

In order to secure the necessary pressure of the brush and to compensate for the separation caused by wear from the rotary electrode, according to Figures 10, 11 and 12, the axle of the brush 18 is slidable horizontally within the groove or channel 19, being pressed by the spring 20 while resting on the ball bearing 21 toward the related electrode. Around the axle of the brush 18 is arranged a protecting sheet 22, for preventing the powder from penetrating into the bearing.

The part of the electric field within which are arranged and operate the brushes, is closed by a partition K. The particles which fall into the segment defined by the partition K, (see Fig. 14) where the attraction exerted by the electrode armature ceases to act, are collected in the container L and conveyed by the conveyor tube M, made of insulating material.

Figure 6:
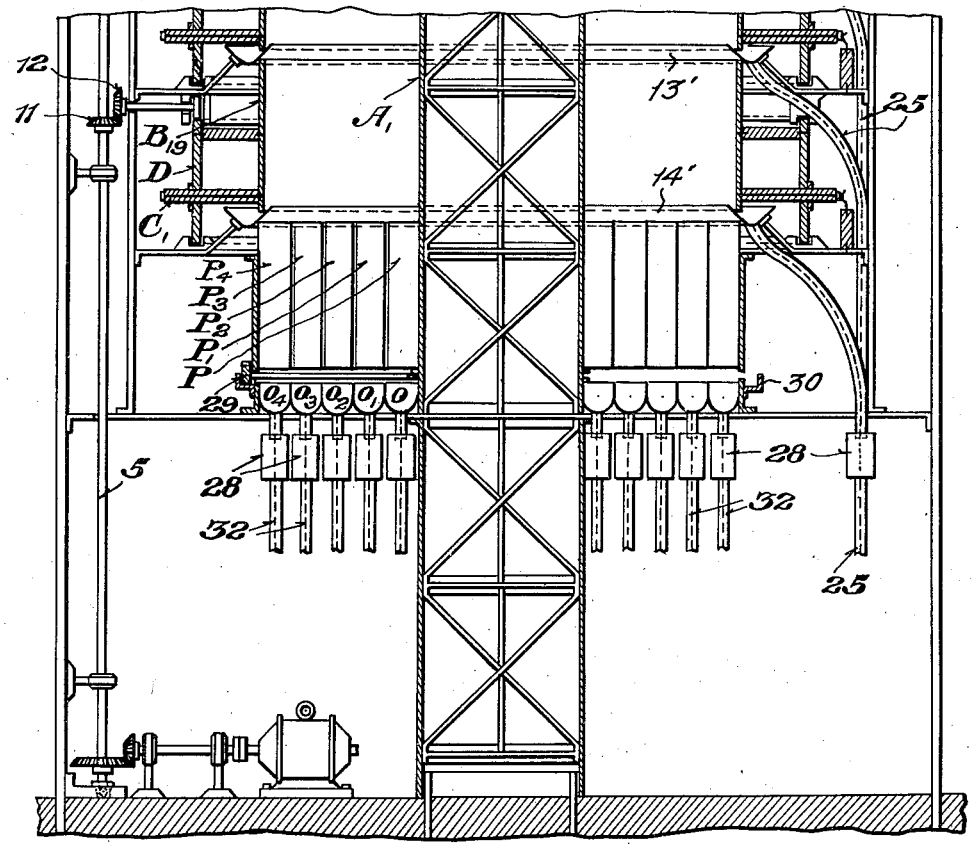
Figure 6 is a vertical section of the lower part of the separator, in accordance with Figure 1.
Figure 7:
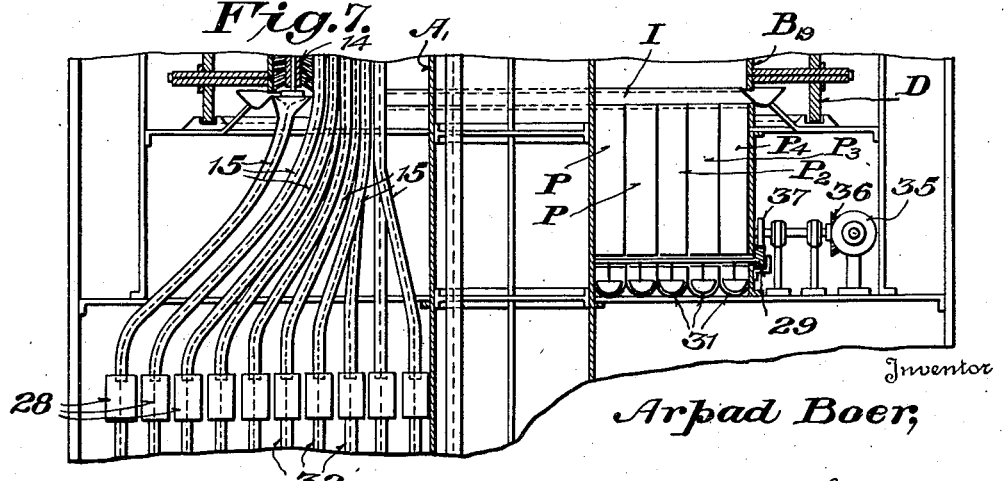
Figure 7 shows a vertical section of the lower part of the separator, taken perpendicularly to the plan view of Figure 6, in accordance with Figure 2.
Figure 13:
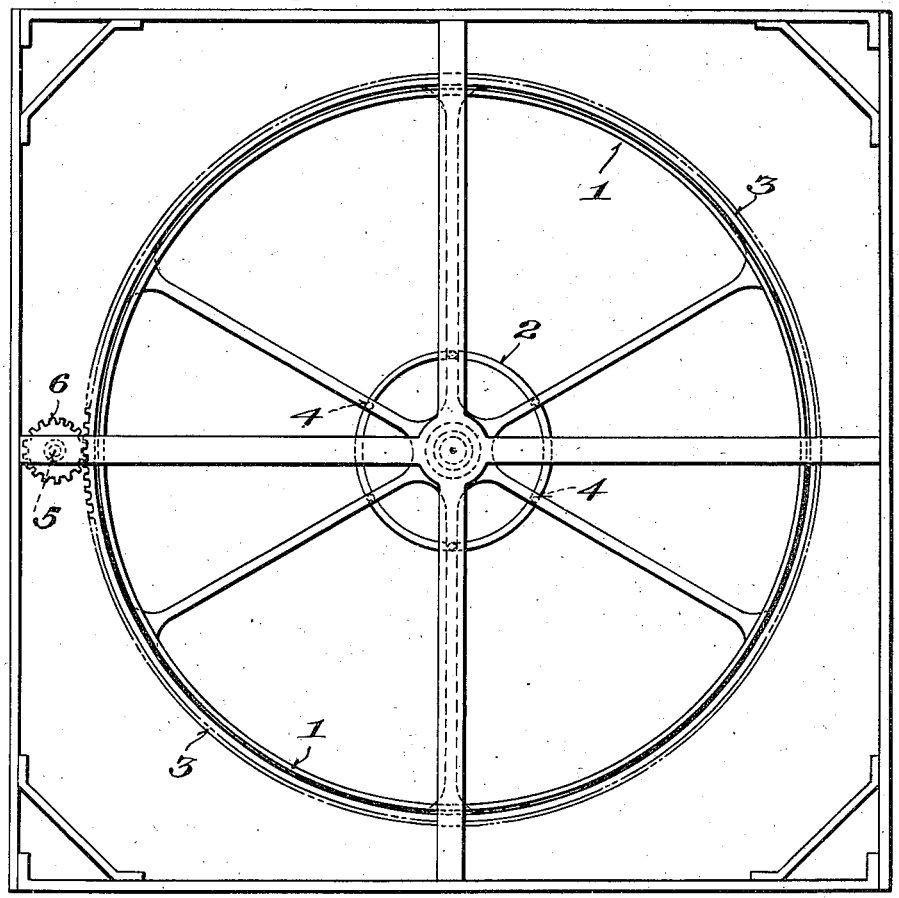
Figure 13 shows a plan view of the feeding hopper.

The particles accumulated within the annular grooves I1', I2', I3', etc., are carried by the movable arms 23 mounted on the rotary cylinder B towards the openings 24 which form the mouths of the conveyor tubes 25 (Figures 1, 6 and 8).

Figures 14, 15, 15A:
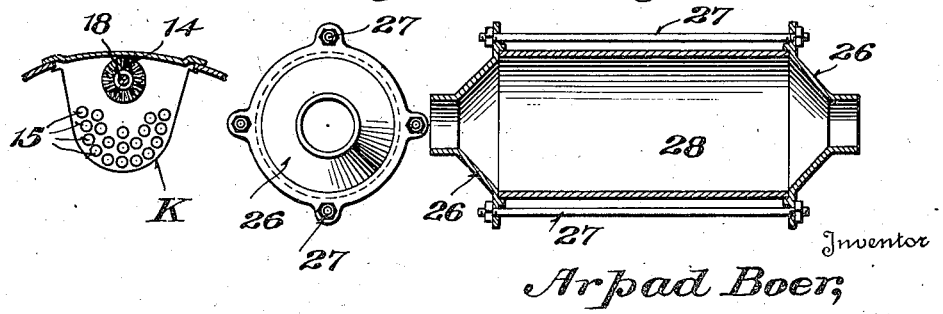
Figure 14 is a plan view of the position of the brush of the last electrical field.
Fig. 15 is a vertical longitudinal sectional view of a device for neutralizing the electric tension of the conveying tubes.
Fig. 15a is an end elevation of the construction shown in Fig. 15.

In order to neutralize the considerable electric tensions created between the rotary electrodes and earth, transmitted by the adhering particles of the conveyor tubes 15 and 25 and by the connection between the falling particles, suitable conductors for neutralizing said electric tensions have been arranged within said conveyor tubes, formed, as shown in Figure 15, of two caps 26 of insulating material, connected by the insulating rods 27 and between which is arranged the cylinder 28, also of insulating material, of a larger diameter than the conveyor tubes.

The operation is based on the principle that the particles, on arriving at a larger space, will separate one from another and thus reduce electric contact. It will be necessary to clean from time to time the walls of the cylinder 28, in order to prevent the particles accumulated thereon, from acting as electric conductors.

The electricity-carrying particles which by their weight and by gravity have partially overcome the attracting forces of the electrodes to which they were submitted during their travel through all the electric fields, will finally fall into the annular grooves, of increasing radii, indicated at O, O1, O2, O3 and O4, arranged at the lower part of the apparatus, where they will separate according to their masses or weight, in a decreasing order, since the attracting forces of the electric fields acted also to deflect said particles from their vertical trajectories in direct relation to their surface dimension and inversely to their mass of weight.

In order to prevent the particles which fall into the annular grooves from becoming mixed with each other, circular plates P, P1, P2, P3 and P4 have conveniently been arranged therein. The particles of material accumulated in the circular grooves O, O1, O2, O3, O4 are conveyed by means of a semi-circular gear 29, mounted to move on the guide rail 30 which operates the paddles 31 for pushing the material into the orifices 32; the semi-circular gear is operated from the axle 33 by means of the gear wheels 34, 35, 36 and 37. A suitable device 38 has been provided for assuring the reversal of motion.

It will be evident that several modifications of construction and detail might be introduced without departing from the scope of this invention, as clearly defined and set forth in the claims annexed to this specification.

Having now clearly described and ascertained the nature of my said invention and in what manner the same is to be performed, I declare that what I claim and desire to secure by Letters Patent, is:

1. In an electrical precipitation separator, a stationary vertically extending central electrode, a plurality of annular electrodes arranged mutually spaced and electrically insulated in a vertical stack surrounding said central electrode, a series of concentric annular collecting troughs arranged at the bottom of said stack, and means for applying between said central electrode and said annular electrodes high voltages which progressively increase from an upper annular electrode to annular electrodes lower in said stack, whereby comminuted materials delivered at the top of said stack are electrically charged and separate into said respective troughs according to their respective surfaces and masses, individual discharge conduits from each of said troughs, and individual expansion cylinders formed of insulating material and connected in each of said conduits for therein separating the stream of particles through said conduit into a plurality of streamlets for reducing the integrated electrostatic effect thereof.

2. In an electrical precipitation separator, a stationary vertically extending central electrode, a plurality of annular electrodes arranged mutually spaced and electrically insulated in a vertical stack surrounding said central electrode, a series of concentric annular collecting troughs arranged at the bottom of said stack, and means for applying between said central electrode and said annular electrodes high voltages which progressively increase from an upper annular electrode to annular electrodes lower in said stack, whereby comminuted materials delivered at the top of said stack are electrically charged and separate into said respective troughs according to their respective surfaces and masses, means for rotating the annular electrodes, a plurality of brushes respectively mounted within said annular electrodes engageable with the inner surface thereof for removing particles adherent thereto, and auxiliary collectors respectively positioned adjacent said brushes for collecting material brushed from said electrodes.

3. The method of electrically separating comminuted materials according to their respective particle sizes and superficial areas which consists in dropping the particles thereof through a vertically arranged series of concentric radial electrostatic fields whose intensities increase progressively downwardly, selectively collecting into ranges the particles at the bottom of said series according to the distance at which said particles alight from the center of said radial fields, then reducing the total electrostatic charge on each of said ranges by separating the stream of discharged particles constituting each of said ranges by enlarging said stream into a plurality of discrete streamlets.

ARPAD BOER.